United States Patent
Peinemann et al.

(10) Patent No.: US 6,277,483 B1
(45) Date of Patent: Aug. 21, 2001

(54) COMPOSITE MEMBRANE WITH SUPPORT STRUCTURE MADE OF MICROPOROUS MATERIAL

(75) Inventors: Klaus-Viktor Peinemann, Geestacht; Detlev Iritsch; Ernst-Moritz Bellingen, both of Hamburg; Michael Deppe, Kempen; Michael Schossig-Tiedemann, Schwsrzenbek, all of (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 0 days.

(21) Appl. No.: 09/126,297

(22) Filed: Jul. 30, 1998

Related U.S. Application Data

(63) Continuation-in-part of application No. PCT/DE97/00133, filed on Jan. 24, 1997.

(30) Foreign Application Priority Data

Jan. 31, 1996 (DE) .............................................. 196 03 420

(51) Int. Cl.⁷ ..................................................... B32B 27/06
(52) U.S. Cl. ...................................... 428/319.3; 428/315.5
(58) Field of Search ..................................... 428/343, 355, 428/315.5, 319.3; 264/473; 210/490, 500.1, 500.41, 500.42

(56) References Cited

U.S. PATENT DOCUMENTS

| | | | | |
|---|---|---|---|---|
| 4,964,989 | * | 10/1990 | Gsell ................................... | 210/490 |
| 5,019,261 | * | 5/1991 | Stengaard ............................. | 210/490 |
| 5,091,086 | * | 2/1992 | Stengaard ............................. | 210/490 |
| 5,376,274 | * | 12/1994 | Muller ................................. | 210/500 |
| 5,641,450 | * | 6/1997 | Kobayashi ........................... | 264/473 |

* cited by examiner

Primary Examiner—Terrel Morris
Assistant Examiner—Ula C. Ruddock
(74) Attorney, Agent, or Firm—Klaus J. Bach

(57) ABSTRACT

In a composite membrane for the separation of water vapors from gases, the membrane comprising a microporous support membrane, a non-porous separation layer based on an originally water soluble cellulose derivative which was made water insoluble is disposed on the support membrane by immersing the support membrane in a water containing bath including a cellulose derivative and the separation layer is then cross-linked with a dialdehyde to render it water insoluble.

7 Claims, No Drawings

COMPOSITE MEMBRANE WITH SUPPORT STRUCTURE MADE OF MICROPOROUS MATERIAL

This is a continuation in part application of international application PCT/DE97/00133 filed Jan. 24, 1997 claiming the priority of German application 196 03 420.5 filed Jan. 31, 1996.

BACKGROUND OF THE INVENTION

The invention concerns a composite membrane for the separation of water vapors from bases, comprising a microporous support membrane and a separating layer disposed thereon.

Water vapors are presently separated from process gas mixtures utilizing absorption processes (for example, glycol dryers) by an adsorption process (for example a molecular sieve process, adsorption to activated aluminum oxide or silica gel) or by refrigeration dryers. Because of the low flow densities and the high product losses, the last mentioned devices are used only with low or medium volume flows.

Absorption processes such as gas drying by means of glycol washers (TEG, DEG) are used in large volume manufacturing processes for example for the processing of natural gas. After being charged with water, the absorption material is regenerated in a second process step. This known process operates at high separation rates and is used therefore particularly for the drying of natural gas.

However, this known absorption process requires a relatively complex processing procedure with a need for a relatively large number of operating personnel and also high investment costs. Furthermore, corrosion and fouling, particularly in the needed heat exchangers result in operational problems. Also, additional costs are incurred by glycol losses and the necessary additives such as antifoaming chemicals and chemicals for the adjustment of the pH value.

With the known adsorption drying process, adsorbing means such as molecular sieves or silica gel are first charged with moisture and, in a second step, the moisture is again removed. In the first step, moisture is collected by the adsorption means and, in a second step, the adsorption means are regenerated by heat, by pressure change or by a dry gas stream. This known process is particularly suitable for the drying of streams with a low moisture content. Also, this known method permits the removal of moisture to a high degree resulting in a low remaining moisture content in the product.

It is a disadvantage of the known methods that the adsorption means need to be regenerated cyclically so that the moisture removal process is discontinuous. For the separation of high moisture loads, this process is therefore too expensive.

Refrigeration dryers are often used for the continuous separation of water vapors from gas mixtures. The dew points that can be obtained thereby are about 2° C. since ice is formed on the cooling coils at lower temperatures. However, lower dew points can be obtained by the use of two parallel apparatus of which one is de-iced while the other is operated to remove moisture. This arrangement however requires high investment costs and has relatively high energy consumption. Consequently, the limits of refrigeration dryers are near the freezing point.

The membrane processes known in the art could, in principle, also be used for the dehumidification of large amounts of gas. However, with the membrane separation, there are always two outlet flows, that is, the cleaned product flow and the moisture loaded permeate flow. Depending on the application, the permeate flow can be returned to the process or it can be rejected. In any case, a high permeate flow results in relatively high operating expenses.

It is the object of the present invention to provide a new membrane which permits high separation rates, which has a good mechanical and chemical stability and which can be used for the separation of water vapors from gas mixtures.

SUMMARY OF THE INVENTION

In a composite membrane comprising of a microporous support membrane, a separation layer based on an originally water soluble cellulose derivative which was made water insoluble is disposed on the support membrane. The support membrane in a water containing bath including a cellulose ether with the separation layer is first immersed and the separation layer is then cross-linked with a dialdehyde to render it insoluble.

The membrane according to the invention facilitates the selective separation of water vapors from gas mixtures. The membrane provides for a high permeability for water vapors and a very low flow permeability for other gases (for example, $N_2$, $O_2$, $CO_2$, $CH_4$). This leads to a particularly high selectivity which results in low product losses. Also, the necessary membrane surface is relatively small. The membrane according to the invention can be employed, for example, for drying natural gas before it is fed into a central distribution system and also for the preparation of air to be compressed. Such membranes may further be used in connection with air conditioning systems for buildings since the natural composition of the air is not changed so that it remains suitable for breathing. Another possibility for its use resides in the dehumidification of inert gases which are used for the drying of sensitive products. By circulating the inert gases, the inert gas consumption can be substantially reduced in this way. This is particularly true for the membrane according to the invention as it has a very low permeability for oxygen/nitrogen.

The mechanical stability of the membranes according to the invention is achieved by the composite membrane structure, that is by the use of different materials. The high separation rates and high flow efficiency are achieved by the kind of polymers used for the membrane according to the invention.

In accordance with the invention, polymers are used which originally were water soluble, but which have been made water insoluble for example by a lattice-like polymerization with one or several dialdehydes. These polymers are all cellulose derivatives. Preferably cellulose ether, particularly hydroxyethyl cellulose and hydroxypropyl cellulose, are employed. A membrane with a selective separation layer on the basis of this cellulose ether is stable with regard to condensates.

The membrane according to the invention can also be made in a simple manner by an immersion process. As a result, no complicated interface polymerization is required as it is the case for known membranes. The cover layer applied to the support membrane can be formed already during the precipitation process of the support membrane by an addition of the membrane polymer to the precipitation bath. Also, by the selection of the cover layer thickness, that is the selective separation layer, the selectivity for the separation of water vapor/gas can be controlled up to a value of 20,000 depending on the requirements. The manufacture of the membrane according to the invention is furthermore relatively inexpensive since commercially available polymers can be used.

The composite membrane according to the invention will be described below in greater detail on the basis of preferred embodiments. Percentage values given in the examples are on the basis of weight if nothing else is indicated.

EXAMPLE 1

A microporous PEI (polyetherimide) membrane is coated in an immersion bath. The coating solution consists of 39.66% ethanol, 60% water, 0.24% glutardialdehyde and 0.1% ethylcellulose (Tylose 4000). The membrane is then dried at a temperature of 70° C. in an oven and is cross-linked in the process. In a second step, a thin silicon layer is applied to the membrane. The silicon layer protects the extremely thin ethyl cellulose layer and closes small pores.

The following permeabilities were determined for this membrane:

$L_{H2O}=45 m^3/(m^2h$ bar$)$ $L_{N2}=0.045 m^3/(m^2h$ bar$)$ selectivity=1000

EXAMPLE 2

A microporous polyether imide membrane is coated in an immersion bath. The coating solution consists of 37.2% ethanol, 61.9% water, 0.6% glutardialdehyde and 0.3% hydroxyethylcellulose (Tylose H4000). For this membrane, the following permeabilities were determined:

$L_{H2O}=15 m^3/(m^2h$ bar$)$ $L_{N2}=0.00075 m^3/(m^2h$ bar$)$

Selectivity=20.000

EXAMPLE 3

A microporous PEI (polyetherimide) membrane is coated in an immersion bath. The coating solution consists of 37.61% ethanol, 62.05% water, 0.24% glutardialdehyde and 0.1% hydroxyethylcellulose (Tylose 4000). Otherwise, the process corresponds to that of example 1. For this membrane, the following permeabilities were determined:

$L_{H2O}=30 m^3/(m^2h$ bar$)$ $L_{N2}=0.05 m^3/(m^2h$ bar$)$

Selectivity=500

EXAMPLE 4

A microporous PEI (polyetherimide) membrane is coated in an immersion bath. The coating solution consists of 39.65% ethanol, 60.0% water, 0.25% glutardialdehyde and 0.1% hydroxyethyl cellulose (Tylose 10000). Otherwise, the process corresponds to that of example 1. For this membrane, the following permeabilities were determined:

$L_{H2O}=45 m^3/(m^2h$ bar$)$ $L_{N2}=0.005 m^3/(m^2h$ bar$)$ selectivity=9000

EXAMPLE 5

A microporous PEI (polyetherimide) membrane is coated in an immersion bath. The coating solution consists of 99.7% water and 0.3% hydroxyethylcellulose (Tylose 100000). Otherwise, the process corresponds to that of example 1. For this membrane, the following permeabilities were determined:

$L_{H2O}=30 m^3/(m^2h$ bar$)$ $L_{N2}=0.086 m^3/(m^2h$ bar$)$

Selectivity=350

What is claimed is:

1. A composite membrane for the separation of water vapors from gases, said composite membrane comprising a microporous support membrane having disposed thereon a non-porous separation layer on the basis of an originally water soluble cellulose ether, which has been made water insoluble.

2. A composite membrane according to claim 1, wherein said cellulose ether is at least one of a hydroxyethyl cellulose and a hydroxypropyl cellulose.

3. A composite membrane according to claim 1, wherein said cellulose ether is made water insoluble by cross-linking with at least one dialdehyde.

4. A composite membrane according to claim 1, wherein the thickness of said separation layer is 0.01 to 0.5 μm.

5. A composite membrane according to claim 1, wherein the thickness of said separation layer is so selected that the water vapor/gas selectivity is 100 to 20000.

6. A composite membrane according to claim 1, wherein said microporous support membrane consists of polyetherimide.

7. A composite membrane according to claim 1, wherein an additional layer of silicon is disposed on said separation layer.

* * * * *